United States Patent [19]
Tucker

[11] Patent Number: 5,722,473
[45] Date of Patent: Mar. 3, 1998

[54] WORKBENCH-BASED INTERCHANGEABLE POWER TOOL MOUNTING AND OPERATING APPARATUS

[75] Inventor: Joseph M. Tucker, Valparaiso, Ind.

[73] Assignee: New Era Industries, Inc., Great Bend, Kans.

[21] Appl. No.: 831,466

[22] Filed: Mar. 31, 1997

[51] Int. Cl.$^6$ ................................................ B27C 9/00
[52] U.S. Cl. .......................... 144/286.1; 144/286.5; 83/574; 83/471
[58] Field of Search ........................ 83/574, 575, 577, 83/471.2, 471.3, 471; 144/1.1, 2.1, 285, 286.1, 286.5; 409/165, 206, 283; 408/20, 234, 237; 108/13, 92, 33, 59, 62, 44

[56] References Cited

U.S. PATENT DOCUMENTS

| | | | |
|---|---|---|---|
| 2,505,568 | 4/1950 | Wilson | 144/285 |
| 2,733,747 | 5/1956 | Franks | 144/286.5 |
| 2,786,500 | 3/1957 | Unterfranz | 144/285 |
| 3,342,226 | 9/1967 | Marcoux et al. | 144/286.1 |
| 3,734,151 | 5/1973 | Skripsky | 144/11 |
| 3,941,002 | 3/1976 | Tucker, Jr. | 74/16 |
| 4,105,055 | 8/1978 | Brenta | 144/286.1 |
| 4,114,665 | 9/1978 | Decker | 144/286.1 |
| 4,230,329 | 10/1980 | Johnson | 280/43.17 |
| 4,335,765 | 6/1982 | Murphy | 144/286.1 |
| 4,483,573 | 11/1984 | Keller | 312/281 |
| 5,161,590 | 11/1992 | Otto | 144/286.1 |
| 5,224,531 | 7/1993 | Blohm | 144/285 |
| 5,329,979 | 7/1994 | Miller et al. | 144/329 |
| 5,431,206 | 7/1995 | McAllister | 144/286.1 |

*Primary Examiner*—W. Donald Bray
*Attorney, Agent, or Firm*—Flanagan & Flanagan; John R. Flanagan; John K. Flanagan

[57] ABSTRACT

A workbench-based interchangeable power tool mounting and operating apparatus includes a workbench frame including a base supported on an upper portion of the frame, at least one main support pallet for mounting an electrically powered tool thereon, an electrical system including a first portion mounted on the main support pallet having a first electrical connector and a second portion mounted on the base and workbench frame having a second electrical connector for connection with an external electrical power source and being matable with the first electrical connector, and a pair of alignment members mounted on the base for receiving and supporting the main support pallet on the base and slidably guiding the main support pallet into and from an installed position on the upper base of the workbench frame in which the first electrical connector of the first portion of the electrical system is electrically mated with the second electrical connector of the second portion of the electrical system for electrically connecting a power tool mounted on the main support pallet with the external electrical power source.

22 Claims, 3 Drawing Sheets

WORKBENCH-BASED INTERCHANGEABLE POWER TOOL MOUNTING AND OPERATING APPARATUS

BACKGROUND OF THE INVENTION

1. Field of the Invention

The present invention generally relates to power tool mounting workbenches and, more particularly, is concerned with a workbench-based interchangeable power tool mounting and operating apparatus.

2. Description of the Prior Art

Heretofore, it has been desirable to have various electrically powered workshop tools all mounted on the same workbench or several workbenches. Unfortunately, space limitations restrict the use of a large enough workbench or several smaller workbenches in home work shops. There have been many attempts to deal with this problem and give the home craftsman the opportunity to use a number of different power tools in a very limited space. With the continuing shrinkage of home workshop space in favor of family living space, a solution to this problem has becomes an ever more important and pressing need for the home craftsman.

Many different power tool workbenches have been proposed in the prior art. Representative examples of these power tool workbenches are disclosed in U.S. Pat. No. 2,505,658 to Wilson, U.S. Pat. No. 3,342,226 to Marcoux et al, U.S. Pat. No. 3,734,151 to Skripsky, U.S. Pat. No. 3,941,002 to Tucker, Jr., U.S. Pat. No. 4,105,055 to Brenta, U.S. Pat. No. 4,483,573 to Keller and U.S. Pat. No. 5,329,979 to Miller et al.

However, it appears likely that most these prior art power tool workbenches would meet with only limited success due to one or more of the following drawbacks: (1) high cost, (2) limited versatility, (3) undue complexity, (4) limited availability of power tools to fit the workbenches, and (5) complicated and time-consuming tool changeover.

Consequently, a need still exists for a power tool workbench construction that will overcome the drawbacks of the prior art workbenches without introducing new drawbacks in their place.

SUMMARY OF THE INVENTION

The present invention provides a workbench interchangeable power tool mounting and operating apparatus designed to satisfy the aforementioned need. The apparatus of the present invention provides a workbench base and interchangeable pallets to mount consumer-provided electrically-powered tools thereupon. Also, interchangeable pallets can be provided for mounting non-electrically powered tools. Thus, each of the pallet-mounted tools when not being used can be stored away and when a given one of the pallet-mounted tools is desired to be used it is mounted on the workbench base which it alternately shares with the other pallet-mounted tools.

Accordingly, the present invention is directed to a workbench interchangeable power tool mounting and operating apparatus which comprises: (a) a workbench frame including a base supported on an upper portion of the frame; (b) at least one main support pallet for mounting an electrically powered tool; (c) an electrical system including a first portion mounted on the main support pallet having a first electrical connector and a second portion mounted on the base and workbench frame having a second electrical connector for connection with an external electrical power source and being matable with the first electrical connector; and (d) a pair of alignment members mounted on the base for receiving and supporting the main support pallet on the base and slidably guiding the main support pallet into and from an installed position on the base of the workbench frame in which the first electrical connector of the first portion of the electrical system is electrically mated with the second electrical connector of the second portion of the electrical system for electrically connecting a power tool mounted on the main support pallet with the external electrical power source.

More particularly, the at least one main support pallet includes a flat platform having an upper side, a lower side, spaced apart front and rear ends, a pair of spaced apart opposite sides extending between the front and rear ends, and a pair of longitudinal guide grooves formed in a lower side of the platform and extending along and adjacent to the respective opposite sides of the platform from adjacent the front end to the rear end of the platform. The aligment members each has a trapezoidal cross-sectional shape, and the longitudinal guide grooves each has a cross-sectional shape complementary to the trapezoidal cross-sectional shape of each alignment member.

Further, the first portion of the electrical system further includes an electrical outlet provided on the support pallet for receiving an electrical plug provided on the power tool when the latter is mounted on the support pallet. The second portion of the electrical system further includes on and off switch means mounted on the workbench frame for controlling the supplying of electrical power to the electrical system from the external electrical power source. The second portion of the electrical system further includes an electrical power cord connected to the on and off switch means.

The apparatus further comprises means for releasably locking the support pallet at the installed position on the base. The locking means includes a latch catch formed into the lower side of the support pallet, and a spring latch mounted at one end to the base and having a locking tang formed at an opposite end and movable toward and away from the lower side of the support pallet so as to place the locking tang at respective latched and unlatched positions relative the latch catch in lower side of the support pallet for correspondingly locking and unlocking the support pallet at and from the installed position on the base.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

3

Figure 5:
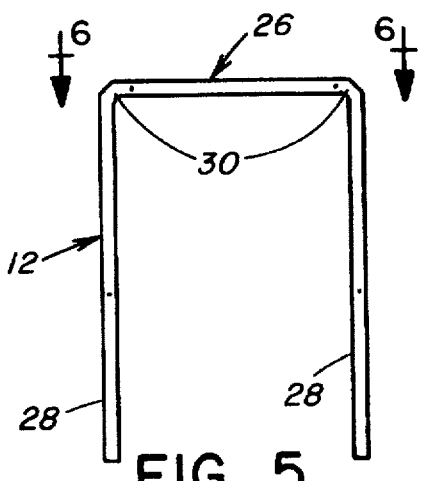
FIG. 5 is an end elevational view of a workbench frame of the apparatus.
Figure 6:
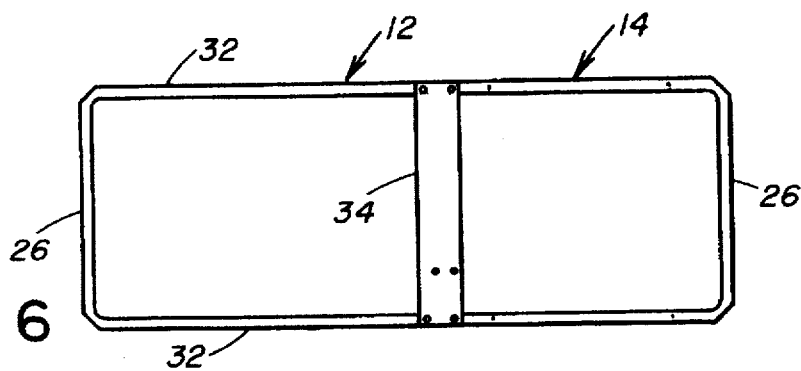

FIG. 6 is a top plan view of the workbench frame as seen along line 6—6 of FIG. 5.

Figure 7:
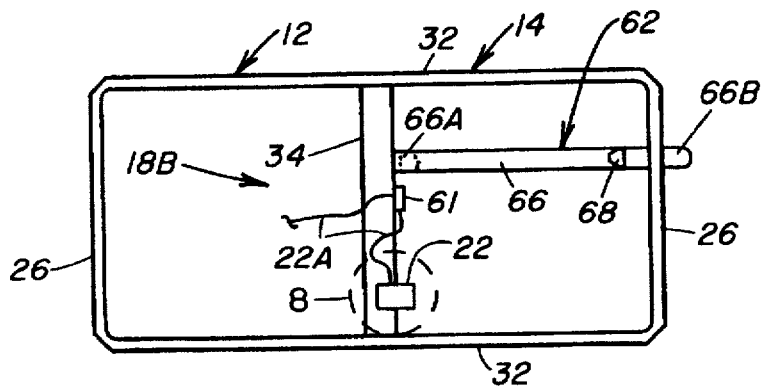

FIG. 7 is another top plan view of the workbench frame similar to that of FIG. 6 but now showing an electrical connector and spring latch mounted thereto.

Figure 8:
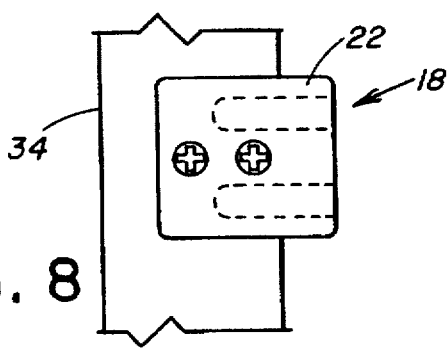

FIG. 8 is an enlarged detailed view of the portion of the frame encompassed by a circle 8 in FIG. 7.

Figures 9, 10:
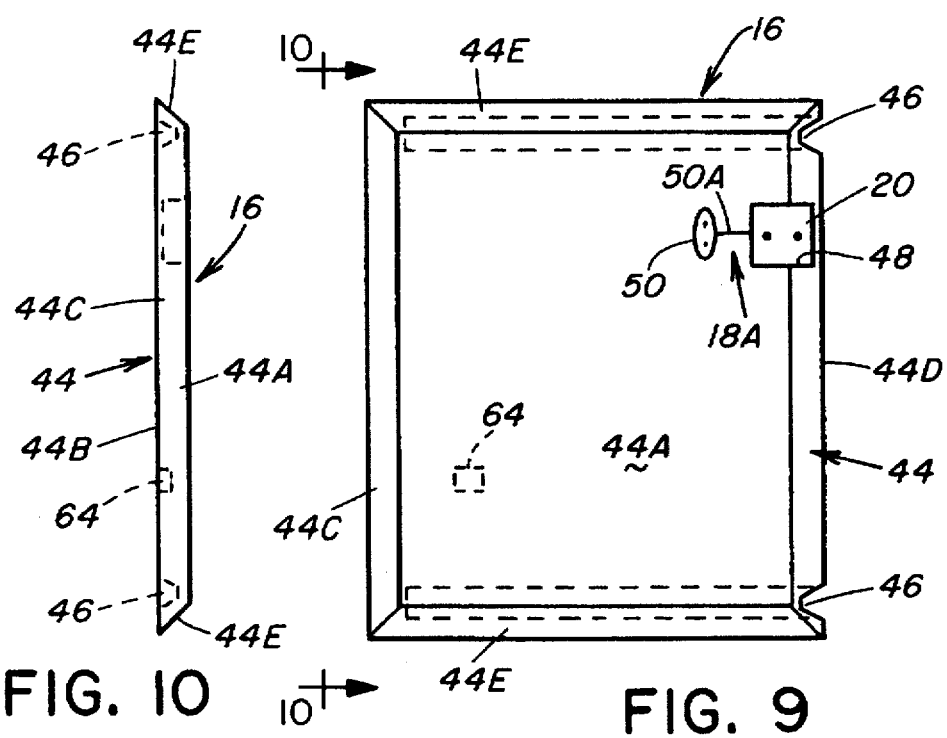

FIG. 9 is an enlarged top plan view of the support pallet of the apparatus.

FIG. 10 is an end elevational view of the support pallet as seen along line 10—10 of FIG. 9.

Figure 11:
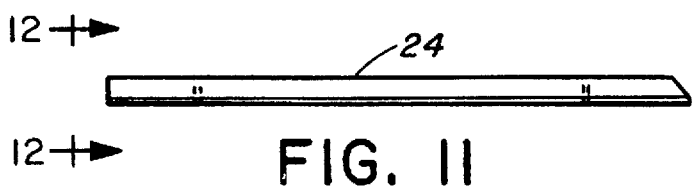

FIG. 11 is an enlarged side elevational view of one of the alignment members of the apparatus.

Figure 12:

FIG. 12 is an end elevational view of the aligment member as seen along line 12—12 of FIG. 11.

Figure 13:
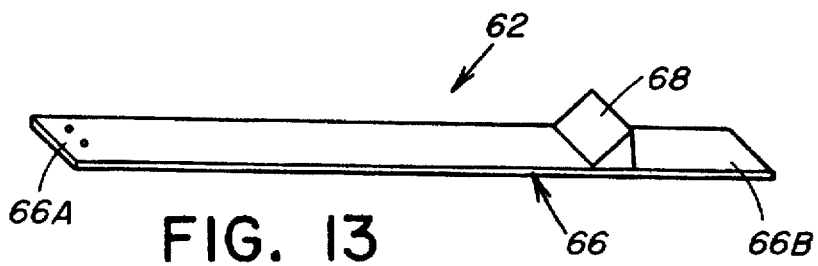

FIG. 13 is an enlarged perspective view of the spring latch of the apparatus.

DETAILED DESCRIPTION OF THE INVENTION

Figure 1:
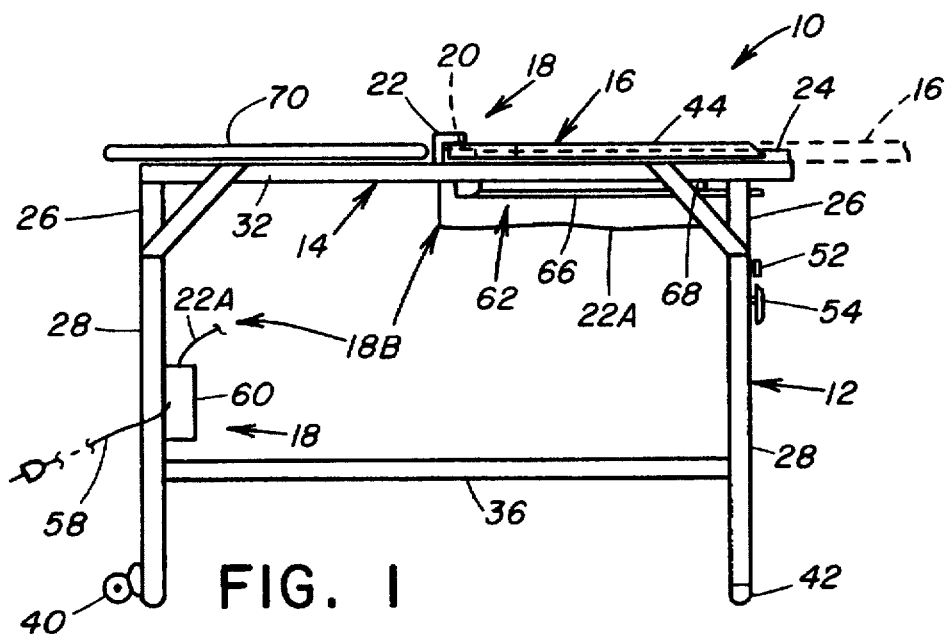
FIG. 1 is a side elevational view of a workbench-based interchangeable power tool mounting and operating apparatus of the present invention.
Figure 2:
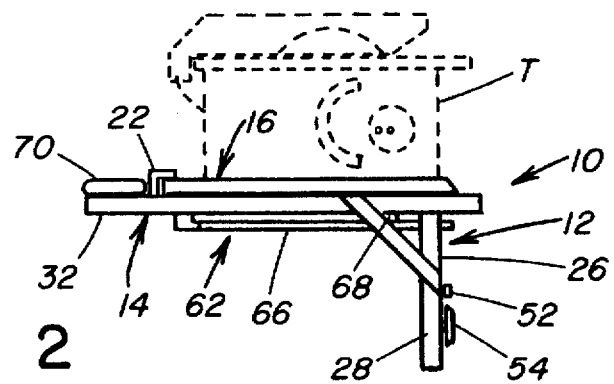
FIG. 2 is a fragmentary side elevational view of the apparatus of FIG. 1 with a conventional power tool mounted on a removable support pallet of the apparatus.

Referring to the drawings and particularly to FIGS. 1 and 2, there is illustrated a workbench-based interchangeable power tool mounting and operating apparatus, generally designated 10, of the present invention. Basically, the workbench-based apparatus 10 includes a workbench frame 12 including a base 14 supported on an upper portion of the frame 12, and at least one and preferably a plurality of main support pallets 16 each for mounting one of a pluraltiy of electrically powered tools T thereon. Only the one pallet 16 and the one tool T need to be shown in the drawings in view that they are each exemplary of the respective pluralities of pallets 16 with associated tools T that are employed at separate times by the apparatus 10. To illustrate other of the pallets 16 and tools T in the drawings would merely add more complexity to the detailed description without contributing to a better understanding of the present invention.

The apparatus 10 also includes an electrical system 18 having a first portion 18A (see FIG. 9) mounted on the main support pallet 16 which includes a first electrical connector 20 (see also FIG. 9), and a second portion 18B mounted on the workbench frame 12 and base 14 which includes a second electrical connector 22 for connection with an external electrical power source and being matable with the first electrical connector 20. The apparatus 10 further includes a pair of longitudinal alignment members 24 mounted on the upper base 14 of the frame 12 for receiving and supporting each of the main support pallets 16 on the base 14 at separate times and slidably guiding the one main support pallet 16 into and from an installed position, as seen in solid line form in FIGS. 1 and 2, on the base 14 of workbench frame 12. At the installed position, the first electrical connector 20 of the electrical system 18 is physically and electrically mated with the second electrical connector 22 thereof for electrically connecting the particular power tool T mounted on the one main suport pallet 16 with the external electrical power source. The pallet 16 is also shown in dashed line form in FIG. 1 before reaching the solid line installed position.

Referring to FIGS. 1-7, in addition to the base 14, the workbench frame 12 of the apparatus 10 includes a pair of inverted U-shaped opposite end frame members 26 defining a pair of upright legs 28. Each of the end frame members 26 has a pair of upper spaced apart opposite corners 30. The end frame members 26 are preferably disposed generally parallel to one another. The frame 12 also includes a pair of upper horizontal longitudinal frame members 32 extending preferably generally parallel to one another between and rigidly interconnecting the opposite end frame members 26 at their upper spaced apart opposite corners 30. The frame 12 further includes an upper cross frame member 34 extending between and rigidly interconnecting the upper horizontal longitudinal frame members 32 about midway between their opposite ends. The frame 12 also includes a pair of middle horizontal longitudinal frame members 36 extending preferably generally parallel to one another between and rigidly interconnecting the upright legs 28 of the opposite end frame members 26 at locations spaced below the upper opposite corners 30 thereof. The frame 12 still further includes a middle cross frame member 38 extending between and rigidly interconnecting the pair of middle horizontal longitudinal frame members 36.

The frame 12 also includes a pair of wheels 40 each rotatably mounted at a lower end of a respective one of the legs 28 of one of the inverted U-shaped opposite end frame members 26, and a pair of non-skid bumpers 42 each mounted at a lower end of a respective one of the legs 28 of the other of the inverted U-shaped opposite end frame members 26. The legs 28 position the workbench base 14 at a comfortable working height and the wheels 40 on the rear legs 28 faciliate easy movement when the front of the frame 12 is raised slightly by using the front portion of the base 14 as a handle. The non-skid bumpers 42 on the front legs 28 are provided to minimize movement of the frame 12 when it is set in place.

The various members making up the frame 12 are made of a suitable strong rigid material, such as steel or aluminum. In the illustrated example of the frame 12, the upper horizontal longitudinal frame members 32 and the upper cross frame member 34 together constitute the upper base 14 of the frame 12.

Referring to FIGS. 1, 2, 9 and 10, each main support pallet 16 of the apparatus 10 includes a flat platform 44 made of any suitable rigid strong material and having an upper side 44A, a lower side 44B, spaced apart front and rear ends 44C, 44D, and a pair of spaced apart opposite sides 44E extending between the front and rear ends 44C, 44D. Also, each main support pallet 16 includes a pair of longitudinal guide grooves 46 each formed in the lower side 44B of the flat platform 44 and extending generally parallel to one another along and adjacent to a respective one of the opposite sides 44E of the platform 44 from adjacent to the front end 44C to the rear end 44D of the platform 44. Each main support pallet 16 further includes a recess 48 formed in the upper side 44A of the flat platform 44 at the rear end 44D thereof. Preferably the respective front and rear ends 44C, 44D and opposite sides 44E are bevelled shaped in cross-section.

Figure 3:
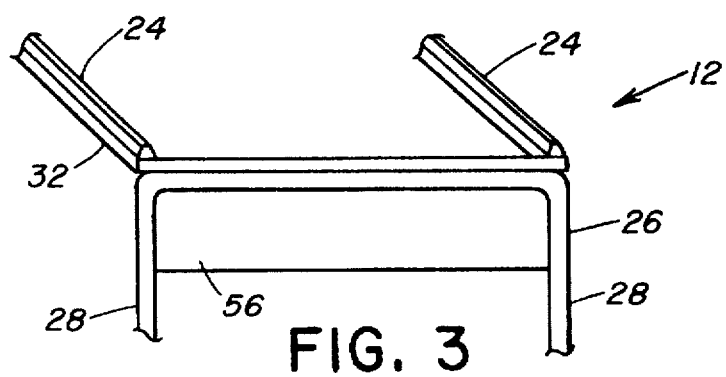
FIG. 3 is a fragmentary end perspective view of a pair of alignment members on a base of the apparatus.
Figure 4:
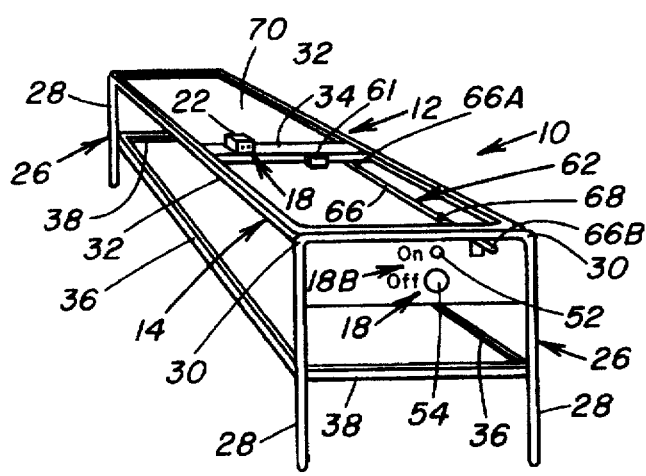
FIG. 4 is an end perspective view of the base of the apparatus.

Referring to FIGS. 3, 11 and 12, the longitudinal aligment members 24 are made of a suitable material, such as nylon or plastic, and fastened on the upper horizontal longitudinal frame members 32 which constitute the upper base 16 of the frame 12. The alignment members 24 extend generally parallel to one another and each has a trapezoidal cross-sectional shape complementary to and matable within the cross-sectional shape of each of the respective longitudinal guide grooves 46 in the lower side 44B of the platform 44 of the support pallet 16.

Referring to FIGS. 1, 2, 4 and 7-9, the first and second electrical connectors 20, 22 can be conventional electrical plug and receptacle types readily known to those of ordinary skill in the art. The first electrical connector 20 preferably is mounted within the recess in the platform 44 while the second electrical connector 22 is mounted upon the upper cross frame member 34 such that when the support pallet 16 is slidably moved along the aligment members 24 into the installed position, the first electrical connector 20 is carried by the pallet 16 into electrically mated relationship with the stationarily positioned second electrical connector 22 on the frame 12.

The first portion 18A of the electrical system 18 further includes an electrical outlet 50 provided on the support pallet 16 for receiving an electrical plug (not shown) provided with the power tool T that is mounted on the support pallet 16. The electrical outlet 50 is electrically connected to the first electrical connector 20 by suitable conductor wires 50A of the system 18. The second portion 18B of the electrical system 18 further includes on and off switch means in the form of suitable push buttons 52, 54 mounted on a front control face plate 56 on the front end frame member 26 of the workbench frame 12. The push buttons 52, 54 are electrically connected by suitable conductor wires 22A to the second electrical connector 22 and to an electrical power cord 58 via a magnetic contactor 60 mounted to the opposite end frame member 26. The push buttons 52, 54 are thus connected for controlling the supplying of electrical power to the electrical system from the external electrical power source via the power cord 58. Once the one support pallet 16 and associated tool T are placed in the installed position of the frame base 14, the on/off switch of the tool is turned and left in its "on" position so that the tool can now be controlled by the on and off buttons 52, 54 of the apparatus 10. When the pallet 16 is placed in the installed position on the workbench base 14, a microswitch 61 (FIGS. 4 and 7) is simultaneously depressed completing the electrical circuit that provides electrical power from the power cord 58 through the magnetic contactor 60.

Referring to FIGS. 1, 2, 4, 7, 9, 10 and 13, preferably, although not necessarily, the apparatus 10 can further include means 62 for releasably locking the one support pallet 16 at the installed position on the frame base 14. In one exemplary form, the locking means 62 includes a latch recess or catch 64 formed in the lower side 44B of the platform 44 of the support pallet 16, and a resiliently flexible spring latch arm 66 mounted at one end 66A to the upper cross frame member 36 of the frame base 14. The spring latch arm 66 has a locking tang 68 formed at an opposite end 66B. The spring latch arm 66 is normally disposed adjacent to the lower side 44B of the pallet 16 such that the locking tang 68 extends into the latch catch 64 to a latched position in which it locks the pallet 16 at the installed position. The spring latch arm 66 is flexibly and yieldably deformable such that an operator can bend and move it away from the lower side 44B of the support pallet 16 so as to displace the locking tang 68 from the lower side 44B of the pallet 16 at an unlatched position relative the latch catch 64 in which it unlocks the pallet 16 from the installed position. Also, referring to FIGS. 9 and 10, optionally, the apparatus 10 may further include one or more auxiliary support pallets for mounting a non-electrically powered tool. These pallets are identical to the main support pallet 16 except there is no need for providing an electrical connector or outlet thereon. Also, the frame 12 can support an optional table top 70 on the half of the base 14 not utilized by the pallet 16.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A workbench-based interchangeable power tool mounting and operating apparatus, comprising:
    (a) a workbench frame including a base supported on an upper portion of said frame;
    (b) at least one main support pallet for mounting an electrically powered tool;
    (c) an electrical system including a first portion mounted on said main support pallet having a first electrical connector and a second portion mounted on said base and workbench frame having a second electrical connector for connection with an external electrical power source and being matable with said first electrical connector; and
    (d) a pair of alignment members mounted on said base for receiving and supporting said main support pallet on said base and slidably guiding said main support pallet into and from an installed position on said base of said workbench frame in which said first electrical connector of said first portion of said electrical system is electrically mated with said second electrical connector of said second portion of said electrical system for electrically connecting a power tool mounted on said main support pallet with the external electrical power source.

2. The apparatus of claim 1 wherein said frame further includes:
    a pair of inverted U-shaped opposite end frame members defining a pair of upright legs, each of said frame members having a pair of upper spaced apart opposite corners;
    a pair of upper horizontal longitudinal frame members extending between and rigidly interconnecting said opposite end frame members at said upper spaced apart opposite corners thereof; and
    an upper cross frame member extending between and rigidly interconnecting said upper horizontal longitudinal frame members.

3. The apparatus of claim 2 wherein said frame further includes:
    a pair of middle horizontal longitudinal frame members extending between and rigidly interconnecting said opposite end frame members at locations spaced below said upper spaced apart opposite corners thereof; and
    a middle cross frame member extending between and rigidly interconnecting said middle horizontal longitudinal frame members.

4. The apparatus of claim 2 wherein said frame further includes a pair of wheels each rotatably mounted at a lower end of a respective one of said legs of one of said inverted U-shaped opposite end frame members.

5. The apparatus of claim 2 wherein said frame further includes a pair of non-skid bumpers each mounted at a lower end of a respective one of said legs of the other of said inverted U-shaped opposite end frame members.

6. The apparatus of claim 1 wherein said main support pallet includes a flat platform having an upper side, a lower side, spaced apart front and rear ends, a pair of spaced apart opposite sides extending between said front and rear ends, and a pair of longitudinal guide grooves each formed in said lower side of said platform and extending along and adjacent to one of said opposite sides of said platform from adjacent said front end to said rear end of said platform.

7. The apparatus of claim 6 wherein said main support pallet further includes a recess formed in said upper side of said platform at said rear end thereof, said second electrical connector being mounted to said main support pallet in said recess therein.

8. The apparatus of claim 6 wherein each of said aligment members has trapezoidal cross-sectional shape and each of said longitudinal guide grooves has a cross-sectional shape complementary to said trapezoidal cross-sectional shape of each of said alignment members.

9. The apparatus of claim 1 wherein said first portion of said electrical system further includes an electrical outlet provided on said support pallet for receiving an electrical plug provided on the power tool that is mounted on said support pallet.

10. The apparatus of claim 1 wherein said second portion of said electrical system further includes on and off switch means mounted on said workbench frame for controlling the supplying of electrical power to said electrical system from the external electrical power source.

11. The apparatus of claim 10 wherein said second portion of said electrical system further includes an electrical power cord electrically connectable to said on and off switch means through a magnetic contact and in response to a microswitch sensing the placement of said pallet at said installed position on said base and completing electrical connection of said power cord to said on and off switch.

12. The apparatus of claim 1 further comprising:
an auxiliary support pallet for mounting a non-electrically powered tool.

13. The apparatus of claim 1 further comprising:
means for releasably locking said support pallet at said installed position on said base.

14. The apparatus of claim 13 wherein said locking means includes:
a latch catch formed in said support pallet; and
a spring latch mounted at one end to said base and having a locking tang formed at an opposite end and movable toward and away from said main support pallet so as to place said locking tang at respective latched and unlatched positions relative to said latch catch in said main support pallet for correspondingly locking and unlocking said main support pallet at and from said installed position on said base.

15. A workbench-based interchangeable power tool mounting and operating apparatus, comprising:
(a) a workbench frame including a base supported on an upper portion of said frame;
(b) a plurality of main support pallets each for mounting an electrically powered tool;
(c) an electrical system including a first portion mounted on said main support pallet having a first electrical connector and a second portion mounted on said base and workbench frame having a second electrical connector for connection with an external electrical power source and being matable with said first electrical connector; and
(d) a pair of alignment members mounted on said base for receiving and supporting each of said main support pallets one at a time on said base and slidably guiding said main support pallet into and from an installed position on said base of said workbench frame in which said first electrical connector of said first portion of said electrical system is electrically mated with said second electrical connector of said second portion of said electrical system for electrically connecting a power tool mounted on said main support pallet with the external electrical power source.

16. The apparatus of claim 15 wherein each of said main support pallets includes a flat platform having an upper side, a lower side, spaced apart front and rear ends, a pair of spaced apart opposite sides extending between said front and rear ends, and a pair of longitudinal guide grooves each formed in said lower side of said platform and extending along and adjacent to one of said opposite sides of said platform from adjacent said front end to said rear end of said platform.

17. The apparatus of claim 16 wherein each of said aligment members has trapezoidal cross-sectional shape and each of said longitudinal guide grooves has a cross-sectional shape complementary to said trapezoidal cross-sectional shape of each of said alignment members.

18. The apparatus of claim 17 wherein said first portion of said electrical system further includes an electrical outlet provided on said support pallet for receiving an electrical plug provided on the power tool that is mounted on said support pallet.

19. The apparatus of claim 17 wherein said second portion of said electrical system further includes on and off switch means mounted on said workbench frame for controlling the supplying of electrical power to said electrical system from the external electrical power source.

20. The apparatus of claim 19 wherein said second portion of said electrical system further includes an electrical power cord connected to said on and off switch.

21. The apparatus of claim 15 further comprising:
means for releasably locking said support pallet at said installed position on said base.

22. The apparatus of claim 21 wherein said locking means includes:
a latch catch formed in said main support pallet; and
a spring latch mounted at one end to said base and having a locking tang formed at an opposite end and movable toward and away from said main support pallet so as to place said locking tang at respective latched and unlatched positions relative said latch catch in said main support pallet for correspondingly locking and unlocking said main support pallet at and from said installed position on said base.

* * * * *